(12) United States Patent
Sun (10) Patent No.: US 7,751,534 B2
(45) Date of Patent: Jul. 6, 2010

(54) SYSTEM AND METHOD FOR THE EMERGENCY VOICE AND IMAGE E-MAIL TRANSMITTER DEVICE

(76) Inventor: Nicholas Sun, 32 Carriage Hill La., Poughkeepsie, NY (US) 12603

( * ) Notice: Subject to any disclaimer, the term of this patent is extended or adjusted under 35 U.S.C. 154(b) by 1356 days.

(21) Appl. No.: 11/207,339

(22) Filed: Aug. 19, 2005

(65) Prior Publication Data

US 2007/0042747 A1 Feb. 22, 2007

(51) Int. Cl.
*H04M 11/00* (2006.01)
(52) U.S. Cl. .................. 379/88.13; 379/88.17; 455/413
(58) Field of Classification Search ............. 379/88.13, 379/88.17; 455/413
See application file for complete search history.

(56) References Cited

U.S. PATENT DOCUMENTS

| | | | | |
|---|---|---|---|---|
| 5,697,060 | A * | 12/1997 | Akahane | 340/7.31 |
| 5,884,193 | A * | 3/1999 | Kaplan | 455/565 |
| 6,072,861 | A | 6/2000 | Yu | 379/93.24 |
| 6,085,231 | A | 7/2000 | Agraharam et al. | 709/206 |
| 6,222,909 | B1 * | 4/2001 | Qua et al. | 379/88.22 |
| 6,252,588 | B1 | 6/2001 | Dawson | 345/329 |
| 6,341,160 | B2 * | 1/2002 | Tverskoy et al. | 379/88.13 |
| 6,351,523 | B1 * | 2/2002 | Detlef | 379/88.14 |
| 6,389,276 | B1 | 5/2002 | Brilla et al. | 455/413 |
| 6,538,561 | B2 * | 3/2003 | Angus | 340/7.21 |
| 6,549,767 | B1 * | 4/2003 | Kawashima | 455/412.2 |
| 6,564,248 | B1 | 5/2003 | Budge et al. | 709/206 |
| 6,697,458 | B1 | 2/2004 | Kunjibettu | 379/88.17 |
| 6,732,151 | B1 * | 5/2004 | Tobias et al. | 709/206 |
| 6,748,421 | B1 | 6/2004 | Ozkan et al. | 709/206 |
| 6,751,453 | B2 * | 6/2004 | Schemers et al. | 455/412.1 |
| 6,763,247 | B1 * | 7/2004 | Hollstrom et al. | 455/556.1 |
| 6,775,359 | B1 | 8/2004 | Ron et al. | 379/88.14 |
| 6,785,562 | B2 * | 8/2004 | Lee et al. | 455/566 |
| 6,826,407 | B1 | 11/2004 | Helferich | 455/466 |
| 7,031,439 | B2 * | 4/2006 | Baxter, Jr. | 379/88.14 |
| 7,035,666 | B2 * | 4/2006 | Silberfenig et al. | 455/556.1 |
| 7,103,154 | B1 * | 9/2006 | Cannon et al. | 379/67.1 |
| 7,286,821 | B2 * | 10/2007 | Kraft et al. | 455/415 |

FOREIGN PATENT DOCUMENTS

JP 2004-355539 * 12/2004

* cited by examiner

*Primary Examiner*—Simon Sing
(74) *Attorney, Agent, or Firm*—Saile Ackerman LLC; Stephen B. Ackerman (57) ABSTRACT

A voice-image e-mail transmitter device that is designed for emergency and surveillance purposes is disclosed. This device converts voice signals and picture images into digital format, which are transmitted to the nearest voice-image message receiving station from where the digital signal strings are parsed and converted into audio and image files, such as ".wav" and ".jpeg" files. The generated files are attached to e-mails and delivered to pre-defined e-mail addresses and a 911 rescue team. The message information includes the caller's voice, pictures of a potential attacker, time the message was sent and received, device serial number, and approximate location of the caller. An external camera and microphone may be connected by wire or wireless means to a CPU element in a base portion of the voice-image e-mail transmitter device. Data may be recorded and sent within seconds by simply pressing and releasing a push button on the device.

20 Claims, 3 Drawing Sheets

SYSTEM AND METHOD FOR THE EMERGENCY VOICE AND IMAGE E-MAIL TRANSMITTER DEVICE

FIELD OF THE INVENTION

The present invention relates to a voice and image transmitter device, which is similar to a cellular phone and sends radio frequencies of human voices and picture images in a digital format. The digital message signal string that is transmitted also includes the sender's name, the time of the message being sent, the device serial number, and pre-defined e-mail addresses. The present invention also relates to a system and method that converts the transmitted digital signal message into e-mail form and delivers the message to the pre-defined e-mail addresses over the Internet for emergency and surveillance use. The local police station or a dedicated 911 center will receive a copy of the e-mail to respond for the emergency call.

BACKGROUND OF THE INVENTION

The cellular phone device has become a very popular and indispensable tool. Its portability provides the most convenient method of voice communication for people in different locations. If any emergency occurs, such as kidnapping or abduction, the victim can dial 911 for help very easily with a cellular phone in hand. However, in many large cities there are still many women and young children missing without a trace each year. Those people usually are the victims of the violent crimes of murder, kidnapping, or sex offender abduction. Some of the adult victims might have carried a cellular phone with them while the kidnapping or abduction occurred, but for some unknown reason they were unable to dial 911 for help when their lives were in danger.

It is not hard to imagine that usually when kidnappers, abductors, or sex offenders commit a crime, they typically want to take control over the victims in the shortest time possible and thereby prevent the victims from using a cellular phone to dial 911 for help. Furthermore, it is not easy for the victims to describe the emergency situation and the location of the crime to the rescue team in just a few seconds on the phone. It would be most difficult for children who don't know how to use a cellular phone to call for help in such a desperate situation. Therefore, a need exists for an affordable telecommunication device that is easier and faster to use in an emergency situation, one that might even deter an attack in the first place.

The concept of transmitting audio and video messages via e-mails has already been applied in video e-mail products such as "SeeMail" by RealMedia Inc. and "VideoLink Mail" by Smith Micro Software Inc. This concept has also been disclosed in several U.S. patents such as U.S. Pat. No. 6,072,861 issued to Yu that relates to a device transmitting audio and image information remotely via e-mail; U.S. Pat. No. 6,085,231 issued to Agraharam, et al. which relates to a method and system for delivering a voice message via an alias e-mail address; U.S. Pat. No. 6,252,588 issued to Dawson that relates to a method and apparatus for providing an audio visual e-mail system; U.S. Pat. No. 6,389,276 which relates to systems and methods for providing voice mail notification from a separate voice mail system to a mobile telephone; and U.S. Pat. No. 6,564,248 that describes an e-mail system with video e-mail player. Other related patents found during a routine search include U.S. Pat. No. 6,697,458 that discloses a system and method for synchronizing voice mailbox with e-mail box; U.S. Pat. No. 6,748,421 which describes a method and system for conveying video messages; U.S. Pat. No. 6,775,359 that relates to voice reply to incoming e-mail messages via e-mail; and U.S. Pat. No. 6,826,407 which relates to a system and method for integrating audio and visual messaging.

However, to our knowledge, the prior art does not include a means to send both voice and picture messages in an e-mail form to a 911 center within a few seconds which would be valuable in making life-saving emergency calls. None of the aforementioned patents is believed to detract from the patentability of the claimed invention.

Although the existing 911 call system provides for the necessary response in many situations, particularly those where an accident or crime has already occurred, a faster way of communication that includes images would be more valuable in certain situations such as in the seconds during a threat period before a crime or dangerous situation fully develops.

SUMMARY OF THE INVENTION

The present invention, hereafter referred to as the voice-image e-mail transmitter device, contains hardware that can convert voice and image data inputted from an external microphone and camera into digital format in a split second, and it is a device that can transmit a digital signal string to local voice-image message receiving stations where the signals are converted into audio and image message files which will be attached to the newly created e-mails and sent to the pre-defined e-mail addresses.

The voice-image e-mail transmitter device contains three internal components similar to a regular cellular phone. The first of these components is a central process unit (CPU) which comprises an A/D converter to perform the function that converts the input voice and image data from analog format into digital format. For handling the input image data, the CPU contains an image processing encoder in addition to the A/D converter. The CPU also comprises a microprocessor that stores the converted input digital data in memory and then combines the converted digital data from memory and constructs an output digital signal string with imbedded XML tags. Secondly, there are two types of internal memory chips which may be used for storing the input text data, the converted input digital voice and image data, and the newly constructed output digital signal string that consists of both input text data and the digital voice and image message data. A third component is an internal clock that generates the time code for the message being sent.

The receiving party of the digital signal message is the nearest local voice-image message receiving station which is the same base station that receives regular phone messages from cellular phone transceiver towers. The software facilities installed at the voice-image message receiving stations are constantly available to accept incoming digital signal messages sent from this voice-image e-mail transmitter device that are relayed via cellular phone towers. Furthermore, the software facilities are responsible to parse out the voice and image messages from the digital signal string to generate audio and image message files such as ".wav" and ".jpeg" files in a split second. The software is also programmed to attach the message files in the newly created e-mails in which code information such as the user name, the time of the message being sent, and the device serial number will all be imbedded. More information about the device serial number will be described later.

The above described digital signal string which contains various code information and message contents may be constructed within the voice-image e-mail transmitter device by the CPU in several different formats. One of the preferred formats is the popular Extensible Markup Language (XML) dialect format. The transmitted digital signal string in XML format can be easily parsed by the software implemented in the voice-image message receiving station.

Additional code information such as the time that the message was received, the voice-image message receiving station code, and the approximate geographical location of the caller may also be imbedded in the e-mails which will be immediately sent to the pre-defined e-mail addresses over the Internet. The voice-image message receiving station code is assigned by the voice-image e-mail transmitter device communication system. This code and the process of finding the caller's location will also be described later.

The purpose of the voice-image e-mail transmitter device is to provide citizens and young children with an extremely simple tool for emergency and surveillance use. It can help many people enjoy a safer life and alleviate the fear of violent crimes. It may also be a valuable tool for national security and national defense purposes because citizens may use this device to capture picture images and provide evidence of suspected terrorist activities. This device may be served as a voice and picture e-mail communication tool to supplement the regular phone voice mailbox. The picture image transmit capability of this device may also be attractive as a recreational tool. Tourists could take an unlimited number of pictures of scenery just as they would with a digital camera. In addition, a modified version of the voice-image e-mail transmitter device having a highly sensitive camera component will enable law enforcement personnel to employ this device for detective work.

This device is preferably very small in size and very light in weight and has features that are easily accessible so that even a school age child can use it. In the exemplary embodiment, the voice-image e-mail transmitter device is comprised of a keypad on a base portion and a screen on a top cover portion. The base and cover may be permanently attached at one end along a rotatable hinge and may have a second attachment in the form of a clasp at an opposite end. This device also has one or more sides that enclose the base and cover portions. There is also a sliding. push button on a side of the base that may be pushed in toward the base to record a message and released to send a message. The sliding push button may be moved sideways in a direction parallel to the top surface of the base in order to disable the device as a security measure. There may be a wire attached to a port on another side of the base that connects the device to an external microphone and camera.

In another embodiment, a typical cellular phone device may be modified to provide the same functions as mentioned in the first embodiment. In this case, a speaker may be incorporated in the cover portion and a microphone in the base portion. A key feature is the addition of a sliding push button on a side of the cellular phone to enable alternative recording and transmitting capability and a security function as mentioned previously.

A communication system that includes this voice-image e-mail transmitter device cannot totally replace the existing 911 system. It must coexist with the 911 system and only be used as a supplemental system for a 911 call. People who are in extremely dangerous situations that do not allow them to have enough time to connect to a 911 center with a regular phone or cellular phone would benefit the most by relying on the voice-image e-mail transmitter device for emergencies. If a victim is murdered, kidnapped, or abducted and he or she disappears without a trace, the victim's voice-image e-mail transmitter device may offer assistance by providing the most significant part of forensic evidence of the crime. As a result, the criminal who committed the violent crime will no longer be able to avoid prosecution so easily, and a lot of resources such as time and money spent on crime investigation can be saved each year.

BRIEF DESCRIPTION OF THE DRAWINGS

FIG. 1A is a diagram of a voice-image e-mail transmitter device that contains a keypad, a screen, a sliding push button, and an invisible wire according to one embodiment of the present invention while

DETAILED DESCRIPTION OF THE INVENTION

The present invention relates to a voice-image e-mail transmitter device that has voice-image digital signal transmission capability and a method of converting the digital signal message into an e-mail form. By using the function of the input data conversion hardware built inside of this device instead of relying solely upon conventional software, the reliability and the speed of converting and transmitting digital signal messages can be greatly improved. Software and hardware necessary to convert the voice and image into digital signals are both believed to already exist and will not be described herein.

Figure 1A:
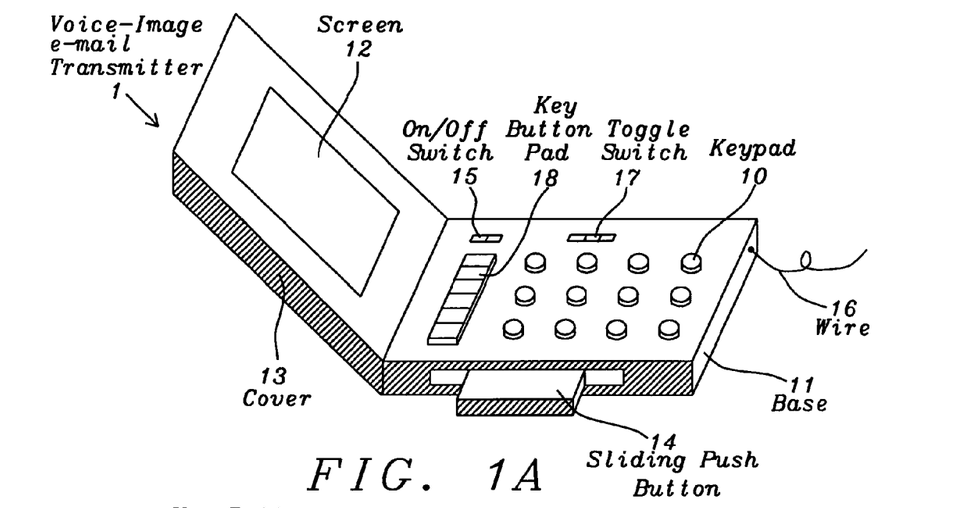

Referring to FIG. 1A, the structure of the voice-image e-mail transmitter device 1 according to the present invention is similar in certain ways to a regular cellular phone. It comprises a central process unit (CPU) which contains integrated co-processors that convert the input voice and image data from analog format into digital format. This device also has two types of internal memory chips which store the input text data, the converted input voice and image data in digital format, and output digital signal string data. Moreover, this device has an internal clock that generates a time code for the message being sent.

A keypad 10 on the voice-image e-mail transmitter device 1 allows the user to type in text data such as his or her name and e-mail addresses and is located on the top surface of a base portion 11. Note that data entry should be done while setting up the device and not in potentially dangerous situations where a fast communication is essential. In one design, the keypad 10 may contain numerical and alphabetical key buttons plus a few other important keys such as the at-sign "@" and dot keys similar to the keypad of a regular PC keyboard.

In one embodiment, the base portion 11 is substantially rectangular in shape and has a certain thickness and a top surface on which the keypad 10 is located. There are four sides surrounding the base portion. A cover portion 13 is also substantially rectangular in shape and may be affixed to the base portion at one end on a hinge. At the opposite end, the top cover portion 13 may have a clasp that attaches to the base portion 11 to close the device. There may also be an antenna (not shown) connected to or imbedded in the base portion 11 that is employed for transmitting digital signals from this device.

The cover portion 13 is comprised of a screen 12 that can be viewed at the same time as the keypad 10. The input text data such as the user name and e-mail addresses which are entered from the keypad 10 by the user will be saved in the internal memory and may be displayed on the screen 12 for verification or for modification. The voice-image e-mail transmitter 1 device may have a registered regular phone number from a phone company which allows the user to receive the voice only phone messages sent from other persons. If the voice-image e-mail transmitter device 1 is employed as a regular cellular phone, then the phone numbers may also be entered from the keypad 10. In one embodiment, a built-in microphone (not shown) in the base portion 11 and a phone speaker (not shown) in the cover portion 13 may be incorporated in the device 1 the same as in a regular cellular phone. Thus, this device may have regular cellular phone capability.

A key feature is a sliding push button 14 that is disposed on a first side of the base portion 11. This push button 14 may be pressed in toward the base portion 11 or moved sideways in a direction parallel to the top surface of the voice-image e-mail transmitter device 1. The sliding push button is a unique feature that is especially designed to promptly record and transmit voice and image messages. For security reasons, the push button 14 may be temporarily disabled. More information about this security feature will be described in a later section.

A wire 16 may be used to connect an external microphone and camera to this device through a port in the base portion 11. In one embodiment, the wire 16 is affixed to a port on a second side of the base portion 11. Optionally, if the voice-image e-mail transmitter device 1 provides wireless connection to the external microphone or camera, then the connection wire and port are not necessary.

The voice-image e-mail transmitter device 1 may be attached to a belt at the waist, put in a purse, or in a pocket of a piece of clothing such as a shirt or pants from where the user may grab the device very easily when he or she needs it.

Figure 1B:
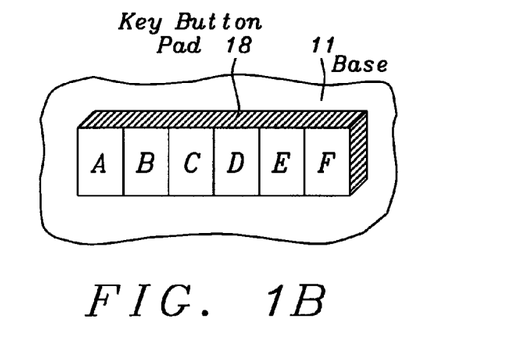
FIG. 1B is an enlarged view of the key button pad and FIG. 1C is an enlarged view of the sliding push button.

Each e-mail address and phone number entered from the input keypad 10 is known as an item. A plurality of items may be formed as a list and stored in the internal memory (not shown) within the base portion 11. A key button pad 18 may be located on the surface of the base portion 11 adjacent to the keypad 10, and in the exemplary embodiment it contains six small key buttons labeled A-F as shown in FIG. 1B. The key button A may be used to scroll the items from the displayed list in a forward direction, and the key button B may be used to scroll the items in a backward direction. The key button C enables the user to select or de-select one or more e-mail addresses or a phone number from the list. The key button D is pressed to send a dial tone if this device is employed as a regular cellular phone. The key button E allows the user to accept input text data from the keypad 10 or to update the text data displayed on the screen 12.

Multiple e-mail addresses may be selected from the list on the screen 12 by pressing the key button C on the key button pad 18 a few times, whereas only one phone number can be selected from the list on the screen 12 each time. Once a phone number is selected from the list, it overrides the selections of all the e-mail addresses. The user may press the key button C to de-select a phone number and reset the selections to all previously selected e-mail addresses.

In one embodiment, the entered items (e-mail addresses and phone numbers) may be stored separately in memory. The e-mail addresses will always be displayed in a sorted order above the sorted phone numbers for easy selection when they are both displayed on the screen 12. Note that user may optionally enter the item owner's name to associate with each of the entered e-mail addresses and phone numbers. The displayed list may be sorted by item owner names instead of by items as a default option. An alternative design may be provided as an option for a user to keep the list non-sorted as its input sequence order or sorted by the items instead of by item owner names. Optionally, a user who frequently uses this device as a regular cellular phone may prefer to display the phone numbers on top of the e-mail addresses in the list.

Figure 1C:
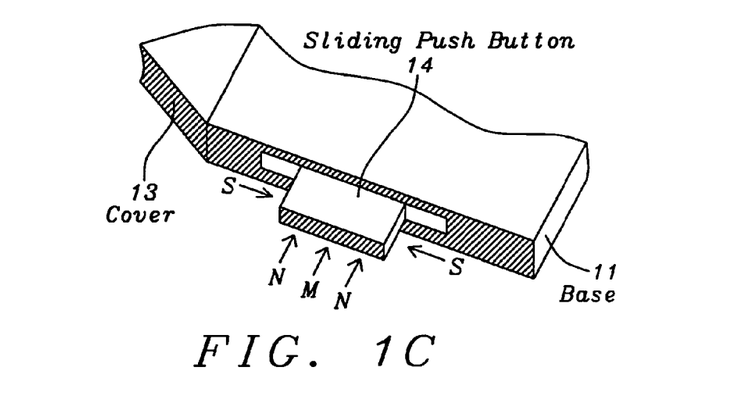

When an e-mail address is selected from the list, it may be designated as the pre-defined e-mail address for the outgoing message. Whenever the push button 14 is pressed inward at the middle position M shown in FIG. 1C, voice signals received from a microphone will be converted into digital format instantly by the CPU (not shown) and temporarily stored in the internal memory (not shown). The voice input may come from the user and/or one or more people in the vicinity of the user. Radio frequencies in a digital signal form will then be transmitted out through the antenna (not shown) of this device as soon as the push button 14 is released. Note that the length of time that the push button is pressed before release may vary from a fraction of a second to multiple seconds depending on the length of the voice and/or image message to be transmitted. Thus, the push button 14 must be held in while all the voice and image input is received. If the user releases the push button 14 too early, then the voice and image input received after that will be interrupted and it will not be recorded or sent. The transmitted digital signal string may be converted into a voice message file in a ".wav" format which will be attached to the newly created e-mail at the voice-image message receiving station, i.e. the base station, from where the e-mail will be delivered to the pre-defined e-mail addresses over the Internet. Meanwhile, the local police station or a dedicated 911 center may receive a copy of the e-mail as a default option of this device.

If a user does not own a personal computer and has not subscribed to an e-mail service, then he or she may choose an item named "default" which is always displayed as the top item of the list on the screen 12. In this case, the newly created e-mails with the attached voice message file will be automatically routed to the local police station or a 911 center over the Internet.

There is an on/off button 15 to power on or power off the voice-image e-mail transmitter device 1. Once the device is turned on, the user must first enter a user name on the screen 12. Then he or she may optionally enter an e-mail address of his or her own.

The software implemented at a voice-image message receiving station may create an e-mail file to associate with each digital message signal string that is received. At the top of the newly created e-mail file there will be three fields generated by the software, which are the sender's e-mail address field, the receiver's e-mail address field, and the subject field. Usually the sender's e-mail address field contains both the user's name and his or her own e-mail address. If the user selected the "default" option, then the sender's e-mail address field will be filled with the user name followed by the base station's e-mail address, i.e. the voice-image message receiving station's e-mail address. In the receiver's e-mail address field, the software will generate an e-mail address of the local police station or a 911 center for the "default" option. The subject field in the copied e-mail file sent to the local police station or a 911 center may contain a very specific title such as "Emergency Call". In the contents field of the e-mail file, the code information relating to the time that the message was sent and received, the device serial number, the voice-image message receiving station code that is assigned by the voice-image e-mail transmitter device communication system, and the approximate geographic location of the caller will all be imbedded. For a private call, the software will generate the pre-defined e-mail addresses in the receiver's e-mail address field, and inserts a links icon that contains the e-mail address of the local police station or a 911 center below the imbedded information code in the e-mail contents field. In case that the recipient discovers the received e-mail is in fact an emergency call instead of a private call, then he or she may click the icon and still be able to forward the e-mail together with the attached emergency message files to the local police station or a 911 center to ask for help.

In one embodiment the voice-image message receiving station code, i.e. the base station code, may be a digit string containing 9 or 10 digits. A digit string of the United States base station code, for example, may contain a three-digit country code followed by a two-digit state code which is followed by the remainder of the digits that represents a unique serial number. This code is imbedded in the e-mail file that may be used to assist the voice-image e-mail transmitter device communication system to easily identify where an emergency call was originally received and delivered.

Note that the software of this system may be designed to provide a secret code which is generated by a formula based on the imbedded code. This secret code may be imbedded in the e-mail file and should not be recognizable to anyone who Operates the voice-image e-mail transmitter device 1. Furthermore, each of the attached voice and image message files will also be imbedded with the secret code to maintain the originality of the e-mail and enable its associated message files to be kept together as a legal document for forensic evidence, if desired. This is another unique feature of the voice-image e-mail transmitter device communication system that can be used to prevent someone from perjuring the document. Any minor changes in the e-mail or attached message files will be very easily detected by a special software program included in this system. The software program is available only to the authorized persons who will search for forensic evidence produced by this device. This special software program is accessible from a software package produced by a manufacturer who will develop the software programs for this system.

Returning to FIG. 1B, the sixth small key button F is pressed to operate the voice-image e-mail transmitter device 1 as a private phone. In this case, the local police station or a 911 center will not receive a copy of any e-mail messages. Without pressing the key button F again to reset the device to the default emergency call phone, the user may still be able to place an emergency call simply by pressing either end (location N in FIG. 1C) of the push button 14. In other words, if the user presses the push button 14 at either end location N instead of pressing in at the center location M while sending out a message, then the local police station or a 911 center will receive a copy of the e-mail regardless of whether or not the key button F has been pressed to set the device for private use.

Since the voice-image e-mail transmitter device 1 is so easy to operate, it might be expected that the 911 centers could be overwhelmed with a high volume of non-emergency calls sent from users, especially those who are young and do not realize the consequences of their actions. Calls that are mistakenly placed in an emergency mode may overload the volume of work for a 911 center and reduce its efficiency to respond to real emergency calls. Thus, it is highly recommended that the user should always press the key button F on the key button pad 18 to set their voice-image e-mail transmitter devices for private use. Similar to the subscriber of the regular cellular phone, the user who chooses the voice-image e-mail transmitter device for private calls may need to pay a nominal annual or monthly fee.

To improve the response time to emergency calls, the 911 rescue team that receives a phone message transmitted from this device may need to give a higher priority response to calls containing a voice message and assign a lower priority to image messages without a companion voice message. It should be appreciated by those skilled in the art that a future law may be required to prosecute people who constantly make false emergency calls using the voice-image e-mail transmitter device.

Figure 2A:
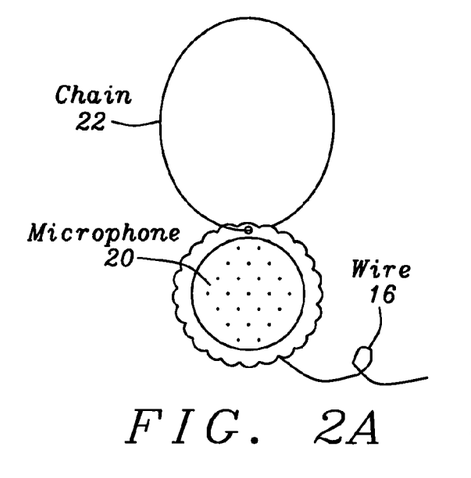
FIG. 2A depicts a microphone with a chain and decoration that can be attached to the voice-image e-mail transmitter device according to one embodiment of the present invention.

Referring to FIG. 2A, one possible design of a microphone 20 is shown. In one embodiment, the microphone is essentially a circular element having top and bottom surfaces and a continuous side that connects the top and bottom surfaces. The top surface has holes therein that allow sound to be received in the form of the user's voice or from a nearby source. The microphone 20 is able to communicate with the CPU in the base portion 11 by either a wire 16 or wireless connection and thereby transmit audio input. A chain 22 may be attached to the side of the microphone 20 to allow the user to wear it around the neck. There may be various kinds of decorations affixed to the side. In one aspect, the decorations may be configured to cover the microphone for the purpose of concealment.

Figure 2B:
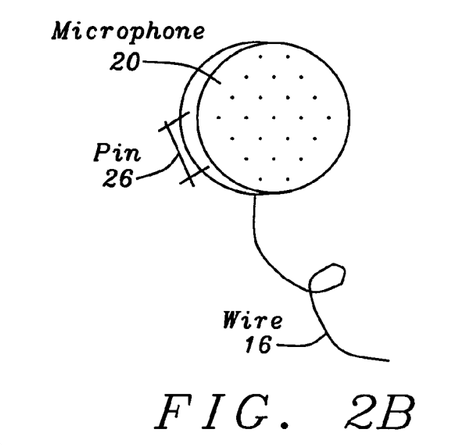
FIG. 2B depicts a microphone that has a button shape and a wire that may be connected to the voice-image e-mail transmitter device according to another embodiment of the present invention.

A second possible design for the microphone 20 is depicted in FIG. 2B. The microphone may be circular in shape and flat like typical shirt buttons. The microphone 20 has top and bottom surfaces and a continuous side as in the first design with holes in the surface to permit sound entry. There is a pin 26 attached to the bottom surface of the microphone 20 as a means of fastening the microphone to an article of clothing worn by the user. A wire 16 may be used to connect the microphone 20 to the voice-image e-mail transmitter device 1, if necessary.

When an emergency occurs, the user may quickly grab the voice-image e-mail transmitter device 1 and press the push button 14 firmly at either position M or N, and then start talking. After a short verbal message is completed the user may release the push button 14 to send out the voice message. The present invention also anticipates that the user may press the push button 14 to record and transmit a potential attacker's voice for identification purposes.

Figure 3A:
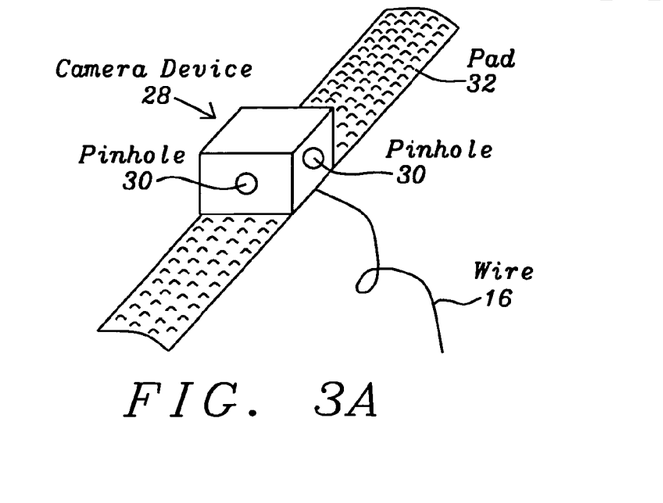
FIG. 3A is an oblique view of a small camera device which can be attached to a shoulder of the user and which is connected to the voice-image e-mail transmitter device by a wire according to one embodiment of the present invention.

A camera may be employed as an additional accessory to the voice-image e-mail transmitter device 1. The camera design may. come in several different shapes. In FIG. 3A, a small camera device 28 is depicted with 2 or 3 pinholes 30. In the exemplary embodiment, there are two small pads 32 underneath the camera that may be employed to attach the camera device to a shoulder of the user. A wire 16 may be used to connect the camera device 28 to the voice-image e-mail transmitter device, if necessary. In one embodiment, the camera device 28 may be concealed by a type of ornament or decoration as discussed previously with respect to the microphone 20.

Figure 3B:
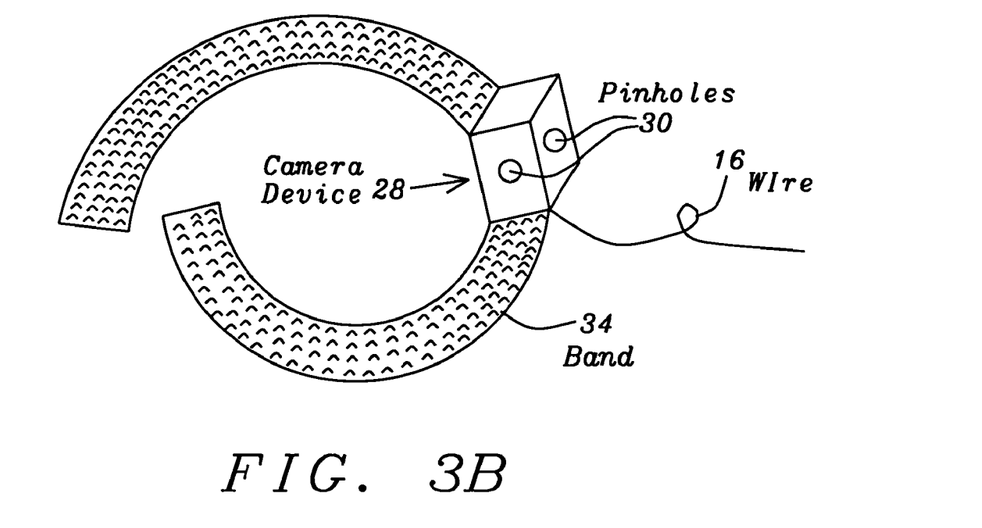
FIG. 3B is a top-down view of the small camera device which may be attached to an arm of the user and which is connected to the voice-image e-mail transmitter device by a wire according to another embodiment of the present invention.

Referring to FIG. 3B, another shape of the small camera device 28 with 2 or 3 pinholes 30 is depicted. In one aspect, there are two bands 34 made of Velcro strips that attach the camera device around an arm of the user. Alternatively, other types of fasteners may be selected which hold the camera in a position that is convenient and comfortable for the user. For example, the camera device may be attached to a belt or a hat worn by the user.

The lenses (not shown) of the camera device 28 must be very sensitive in order to allow pictures to be taken with relatively clear results even in low light conditions. Preferably, the camera lenses should be capable of taking pictures in wide angle so that the user does not need to worry about centering a shot under stressful conditions. The shoulder pad and the arm strips of a multiple pinhole camera device 28 are preferably very small in size so as not to be easily detected by a potential attacker. This voice-image e-mail transmitter device 1 allows connections to several pinhole cameras simultaneously so that a single user may wear multiple cameras on the shoulders, arms, or in other locations. In other words, there may be more than one port in the base 11 to allow connections to two or more cameras. Alternatively, a single port in the base 11 may allow wires from two or more cameras to pass there through. Of course, multiple cameras would add expense to the device. Thus, multiple versions of a voice-image e-mail transmitter device may be made available that are affordable for different income groups.

Assuming advanced technology exists to enable a wireless connection between an external microphone and/or camera to the voice-image e-mail transmitter device 1, then the connection wire 16 is not needed. In this case, the microphone 20 and camera device 28 may be hidden in a hat, a pair of eye glasses, a tie clip, a wrist watch, a finger ring, or other clothes or jewelry items without being easily detected by potential attackers.

When an emergency occurs, the user may quickly grab the voice-image e-mail transmitter device 1 and press the push button 14 firmly at position M or N, depending on whether or not the device has been set for private use at button F. A picture will be taken every few seconds as long as the push button 14 is pressed and not released. If the push button 14 is released in a very short period of time, then there will be only a single picture image frame collected and transmitted instead of two or more frames. However if the push button 14 is pressed long enough, then every few seconds the input analog signals of the picture image taken during a particular interval will be instantly converted into digital format by the CPU and temporarily stored in the memory. When the push button 14 is released, a CPU constructed output digital signal string which contains all the stored picture images will be transmitted in a second or less to the voice-image message receiving station where the digital signal string will be converted into image message files in a ".jpeg" format and then attached to the newly created e-mail file and delivered to the pre-defined e-mail addresses over the Internet. Note that picture and voice input may be received simultaneously from the camera device 28 and microphone 20 by the voice-image e-mail transmitter device 1. In a preferred embodiment, pictures and voice output from the voice-image e-mail transmitter device 1 will be sent simultaneously in the same output digital signal string to a voice-image message receiving station. However, the present invention also anticipates that the user may not wish to speak if they are in a dangerous situation and do not want to draw attention from a potential attacker. In this case, only background sound comprised of voices from surrounding people will be transmitted with the pictures. Thus, voice and image message files may be attached to the same e-mail file if they are transmitted to the voice-image message receiving station within the same digital signal string.

In one embodiment, the voice-image e-mail transmitter device 1 may contain a three-way toggle switch 17 (as shown in FIG. 1A) which is preferably on the top surface of the base portion 11. It is a unique feature of this device that allows the user to select whether to send a voice message only, a picture image message only, or both voice and image messages simultaneously depending upon the toggle switch bar position. The default setting of the toggle switch bar is in the middle position and enables both voice and image messages to be sent when push button 14 is released. Optionally, the toggle switch bar may be moved to either end and thereby allow only one type of message to be transmitted. For example, a manager who is out of the office and wants to send an oral instruction to his secretary during non-work hours would likely select the send voice message only option on the toggle switch bar. On the other hand, a tourist may select the send picture image message only option on the toggle switch bar and operate this device as a digital camera.

In another embodiment, the capacity of the internal dynamic memory within the base portion 11 of the voice-image e-mail transmitter device 1 may be expanded to 256 MB or larger to provide an alternative processing function. Instead of transmitting the digital signal string to the voice-image message receiving station to produce separate voice and image message files, such as ".wav" and ".jpeg" files, the large capacity memory of this device would enable large sized video message files to be generated in a ".wmv" or ".mpg" format. The aforementioned formats combine audio and video digital data into one file like a motion picture file and can provide much more effective audio and visual information. This embodiment provides functionality similar to a camcorder. In this case, the three-way toggle switch accessory component for selecting a message type is not required.

Figure 4:
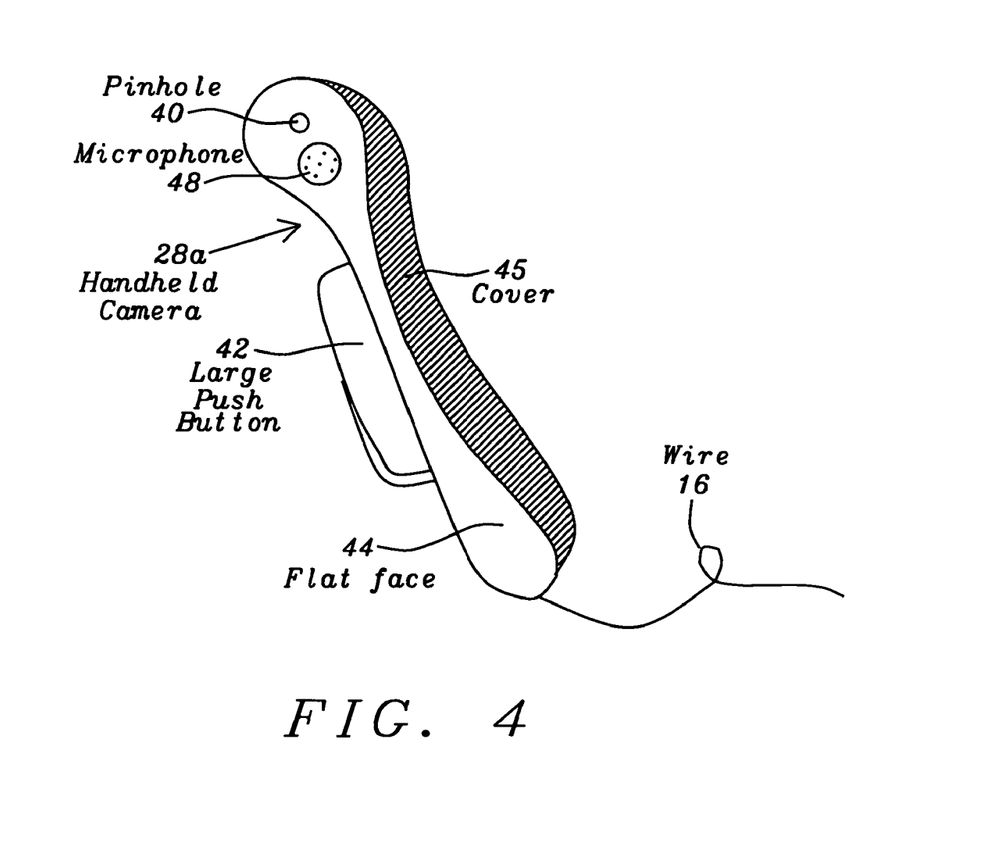
FIG. 4 depicts a simple camera device which contains a handle bar, a pinhole camera, a microphone, and a push button according to one embodiment of the present invention.

Referring to FIG. 4, an alternative camera device design is a handle bar shape. In one aspect, the handheld camera device 28a is comprised of a substantially flat face 44 and a curved portion or cover 45 that functions as a grip for the user to hold the camera device. One or two camera pinholes 40 may be positioned at one end of the flat face 44. On the cover 45 of the handheld camera device 28a there is a large push button 42. A wire 16 can be used to connect the microphone 48 to the voice-image e-mail transmitter device 1, if it is needed.

When an emergency occurs, the user may quickly grab the handheld camera device 28a and point the pinholes 40 toward the desired direction. Then the user may press the push button 42 to take pictures of a threatening person or potentially dangerous surroundings. A small microphone 48 may be incorporated on the flat face 44 if the user wishes to send a voice message. Obviously, in this embodiment the external microphone 20 described earlier may not be necessary if there is a camera device 28a having a small built-in microphone 48 that communicates with the base portion 11.

The push button 42 on the handheld camera device 28a and the push button 14 on the voice-image e-mail transmitter device 1 perform the identical function. Therefore, when the push button 42 is pressed the user does not need to press the push button 14 at all. By pressing either end of the push button 42, the user may still send an emergency message even if the small key button F on the button pad 18 has already been pressed to set the device for private use. Note that voice and image signals from the handheld camera device 28a will be sent one way to the voice-image e-mail transmitter device 1 and then the digital signal string which contains the voice and image messages will be transmitted immediately through an antenna (not shown) to a voice-image message receiving station.

There are two types of internal memory chips (not shown) included in the voice-image e-mail transmitter device 1. One is static memory and the other is dynamic memory. The capacity of static memory is relatively small compared to the dynamic memory and may be used for storing the input text data such as the user name, e-mail addresses, and phone numbers which are entered by the user from the keypad 10. The voice-image e-mail transmitter device 1 is powered by a re-chargeable battery (not shown) within the base portion 11 as in a regular cellular phone. The data stored in the static memory area will not be lost even if the battery is drained or the power of the device is turned off using an on/off button 15. The capacity of the dynamic memory element must be large enough to simultaneously hold the converted digital voice signals received from the microphone 20 (or 48), the converted digital picture images signals taken from the camera device 28 (or 28a), and the CPU constructed output voice and image digital signal string. All data in dynamic memory will be flushed and the space will become reusable as soon as the output digital signal string data is transmitted or when the power of the device is turned off.

For security reasons, when the voice-image e-mail transmitter device 1 is turned on by pressing the on/off button 15, a window panel will be displayed on the screen 12 to request the user to enter a password. Since the important user specified input text data, such as the user name, e-mail addresses, and phone numbers, are all stored in the static memory and can be displayed on the screen 12 whenever this device is activated, access to the confidential data must be protected by a password. Thus, each time the voice-image e-mail transmitter device 1 is activated, a password window panel will pop up to request the user to enter a password to login. Without knowing the correct password, no one else except the user is able to use the voice-image e-mail transmitter device 1 to retrieve the important information.

When an emergency occurs and either the push button 14 or the push button 42 is pressed to send out the emergency message, the user may subsequently press either side (location S in FIG. 1C) of the push button 14 to quickly slide it parallel to the top surface of the base portion 11 and set it in a delayed disable mode. Note that push button 42 also has the same security feature as push button 14 but the middle, ends, and sides are not labeled in FIG. 4. After either the push button 14 or the push button 42 is moved to one side, the user may still press either push button to send out a few more messages. However, after a pre-determined period of time such as a few minutes has elapsed, the function of both push buttons will be disabled and no further messages are allowed to be sent out.

When the message sending function is disabled, the push button 14 cannot be pushed down by the user. Since the signals may only be sent one way from the handheld camera device 28a to the voice-image e-mail transmitter device 1, the push button 42 may still be pushed down but no message will be sent out if the message sending function of push button 14 and push button 42 has been disabled.

The message sending function may be enabled again only when the user enters a correct password from the screen 12. With this unique security feature of the voice-image e-mail transmitter device, the user may lock this device and thereby prevent it from being used by a criminal after a violent crime occurs. This means a criminal cannot gain access to this device and send a false message that contradicts or questions the original message sent by the user.

In an alternative embodiment, a small sliding switch (not shown in FIG. 1A) that is preferably located adjacent to the push button 14 on the same side of the base portion 11 may be implemented. This sliding switch performs the locking function associated with a sliding push button 14 in a previous embodiment. Thus, the push button in this embodiment may be capable of only an in/out motion at position M or N with no freedom to move sideways at position S. In other words, the push button 14 locking feature is controlled by a different element, i.e. the sliding switch, on the base portion 11. This sliding switch may have sufficient resistance so that the user cannot accidentally slide it sideways and thereby lock the push button 14.

The voice-image e-mail transmitter device 1 is equipped with an internal clock (not shown) in the base portion 11 to provide an accurate time stamp code of the message being sent. The date and time of the clock may be adjusted, reset, and displayed on the phone screen 12. Thus, this voice-image e-mail transmitter device 1 may also be used as a timer device to replace a wrist watch.

In view of the existing internal memory chips and CPU, a minor modification and a few additional keys may be added to the keypad 10 to upgrade the voice-image e-mail transmitter device 1 to perform like a handheld PDA with features such as a daily planer book, address book, pocket notebook, video games, and calculator functions as appreciated by those skilled in the art. It should be understood that the PDA-like features would increase the cost of the device.

In another embodiment, the voice-image e-mail transmitter device 1 may include an advanced function that allows software similar to an Internet Web browser to be installed in this device. This advanced function enables the user to read e-mail from the Internet and access data from attached voice and image message files. A sound card (not shown) may be incorporated in the voice-image e-mail transmitter device 1 to allow the user to hear sound from the attached voice e-mail via the phone speaker. Furthermore, this advanced function may also allow the user to display the pictures in the attached image e-mail on the screen 12 to achieve the two-way voice and picture e-mail communication function on this device. The capability of reading e-mail messages has already been provided with various Internet Web browsers on a regular PC. Software necessary to support a similar type of function on some types of regular cellular phones is believed to already exist and therefore will not be described herein.

The present invention is also a system comprised of the previously described voice-image e-mail transmitter device, at least one tower for transmitting the voice and image digital signals, and a voice-image message receiving station comprised of software facilities that are capable of parsing out the voice and image information from the received digital signal strings and create e-mail files there from. The tower is preferably a cellular phone tower which is at a location that can relay signals received from a cellular phone and the voice-image e-mail transmitter device. If two or more nearby towers receive the digital signals at essentially the same time, then the locations of these towers may be used as reference points to approximate the geographical location of the caller using a well known triangulation process. This process may be performed in about a second by software that is installed at the nearest voice-image message receiving station. The system and method of the locator for the 911-enabled wireless communication network that is necessary for finding the cellular phone caller's location is believed to already exist. Instead of completely relying upon the system, it is highly recommended that, if time permits, the users should always provide information about their exact location so that the 911 rescue team can execute the rescue mission more efficiently.

The communication system that includes the voice-image e-mail transmitter device cannot totally replace the existing 911 system but must coexist with the 911 system and only be used as a supplemental system for a 911 call. For example, a cellular tower that relays the normal cellular phone messages could also be employed to relay the signals transmitted from this device, and the cellular phone base stations could also be employed as the voice-image message receiving stations. For situations that are thought to be not life threatening such as a family illness, then a person is recommended to directly dial 911 instead of using the voice-image e-mail transmitter device to contact 911 for help. In some cases, the caller may obtain assistance from a 911 rescue team faster by direct dialing 911 than by placing a voice-image e-mail transmitter device phone call. In general, a voice-image e-mail transmitter device phone message is preferred over a direct call to 911 when the user's freedom is restricted in some way because of a dangerous situation. For instance, the user may want to be unobtrusive and not draw attention when in a group of people that are threatened. However, the user could still transmit background sound and images by quietly pressing and releasing the push button 14. This security feature is also preferred over a direct call to 911 when the time for an emergency call is limited to a few seconds. In some cases, there may be enough time for the voice-image e-mail transmitter device to send out repeated emergency messages within a 5 to 10 second period to catch the 911 rescue team's attention. Because of an extremely dangerous situation, the user may not be able to provide the rescue team with all the desired information for a quick response. However, sometimes partial information such as a voice message only or an image message only might be preferable to an inability to send the 911 center any information at all. Therefore, it is very important that the user should always carry this device for their own protection because the present invention can provide an alternative choice to contact 911 during emergency situations.

One advantage of the present invention is that people who are in extremely dangerous situations that do not allow them enough time or freedom to connect to a 911 center with a regular phone or cellular phone would be able to send a voice or picture image message with the voice-image e-mail transmitter device by simply pressing a button to record a message or take a picture and then release the button to send the information. This entire sequence could be accomplished in matter of a few seconds.

With the availability of this versatile device, people should not feel defenseless any more when faced with potential attackers or dangerous situations. The national crime rate should be greatly reduced due to the contribution of this system if a substantial number of people take advantage of this new device for their protection. Similar to the existing cellular phone system, the voice-image e-mail transmitter device depends on available phone towers to relay signals and an appropriate number of base stations to enable an adequate response to messages. Some locations of the country are still isolated because of a lack of phone towers and/or base stations. Government or private funding is necessary to build an infrastructure that will cover the entire country and allow all citizens to be protected no matter where they are located. Conceivably, the voice-image e-mail transmitter device could be used anywhere in the world to save lives as long as there is infrastructure in place to support its function. However, an extensive campaign may be necessary to educate other nations to appreciate the power of the voice-image e-mail transmitter device system and upgrade their existing wireless communication network systems accordingly.

It is also anticipated that some cellular phone transceiver towers in this country and others may still operate under an older technology and are capable of providing services only to people with analog cellular phones. Those phone towers might not be able to receive or transmit radio frequencies in digital signal format and are therefore incompatible with this device and the digital cellular phone signal receptions. As a result, the need for regulations to define a national standardized wireless communication network technology will need to be addressed to allow the modern convenience of digital signal processing at cellular phone towers across the country.

Although there are differences between the digital signals sent from the regular cellular phone and from this voice-image e-mail transmitter device, the present invention encompasses an embodiment wherein the FCC or another authority assigns a new range of radio frequency bandwidth specifically selected to accept digital signals transmitted from the voice-image e-mail transmitter devices. This action would assist the base stations to easily distinguish these two types of digital signals for a speedy response to emergency calls.

The voice-image e-mail transmitter device communication system relies heavily upon the efficiency of the Internet Service Providers (ISPs) for delivering e-mail messages. Some ISP companies have poor performance in terms of constantly delaying e-mail deliveries, which is not desirable for emergency calls during extremely dangerous situations. In a preferred embodiment, each voice-image message receiving station selects a reliable ISP company that allows rapid and uninterrupted delivery of e-mail messages which will in turn guarantee that the voice-image e-mail transmitter device communication system will function at an optimum level.

In some situations, the voice and image e-mail messages generated by the voice-image e-mail transmitter device may be considered as legal forensic evidence of crime, similar to DNA evidence. To prevent people from producing fake evidence by using a voice-image e-mail transmitter device that does not belong to the victim, certain actions may be taken. In one embodiment, a unique traceable number is assigned to each newly created voice-image e-mail transmitter device in compliance with manufacturers and telecommunication regulations of a particular country. This number may contain a country code, a manufacturer code, the year and month that the device is made, and a unique serial number specified by the manufacturer. This serial number may be attached to each device permanently so that it cannot be removed or altered manually by the user. In one aspect, this device serial number code may be transmitted in an e-mail message with other information such as the user name, the time when the message was sent, and the pre-defined e-mail addresses whenever a voice or image message is sent. Registration of the device serial number and its associated user name in a national database may be required when the user purchases such a device. There may also be guidelines provided to law enforcement personnel and prosecutors regarding how to investigate and legally present the forensic evidence created by the voice-image e-mail transmitter devices.

Due to the significant value of the forensic evidence in e-mail files produced by the voice-image e-mail transmitter device, each of the local voice-image message receiving stations should be equipped with sufficiently large storage space to maintain all received message files and generate a catalog for future reference to enable ready access to a particular file. This embodiment may encompass a new software system that allows a capability to easily search for and retrieve information in the archived files of the storage space.

In another aspect, the voice-image e-mail transmitter device communication system may be designed so that messages are traceable like phone records available from regular phone communications. Thus, whenever an e-mail is delivered by a local voice-image message receiving station, that station may be held responsible for recording in a computer database the device serial number, the time that the e-mail was received and delivered, and the approximate geographical location code of the caller. If a voice-image e-mail transmitter device is stolen from a victim who has been murdered, kidnapped, or harmed in other ways, then the police may check the records from a database to trace the voice-image e-mail transmitter device and the criminal. The present invention also anticipates that the police may investigate the content of a suspicious e-mail sent from a missing voice-image e-mail transmitter device. This type of detective work would be possible only if the voice-image e-mail transmitter device had not been locked by disabling the function of the push button. The investigative capability described herein may lead to the capture of a criminal based on information from the traced phone records or from intercepted e-mails.

There are many advantages of the voice-image e-mail transmitter device communication system other than to deter potential attackers and provide forensic evidence. For example, if a person who is carrying the voice-image e-mail transmitter device was an eye witness to a hit and run accident, then he or she may help the police to solve the crime by using this device to take a picture of the perpetrator's car license plate number. If a person is accidentally trapped underneath a collapsed building or injured or disabled in a remote area, then he or she may use this device to continuously send out messages to ask for help. The voice-image e-mail transmitter device certainly can help the victims to communicate with a 911 rescue team and guide them to locate the accident location much easier and faster than other devices and it can save lives.

One possible design of this voice-image e-mail transmitter device may include an embodiment that comprises this device connected to a regular laptop or desktop Personal Computer through a data communication line such as a Universal Serial Bus (USB) cable line to perform a two-way voice and picture e-mail communication function. When this device is connected to a regular PC via a USB data line, the antenna function of this device will be automatically disabled. In this embodiment, a special software facility similar to the one that is implemented in the voice-image message receiving stations will need to be installed in the regular PC. When the push button of this device is released, the digital signal string that contains the recorded voice and image messages will be sent through USB data line to the PC operating system. Then the software installed in the PC will parse the digital signal string and create the voice and image message files in a ".wav" format and a ".jpeg" format, which will be attached to the newly created e-mails and sent to the pre-defined e-mail addresses over the Internet. The three-way toggle switch of this device may be employed by the user to send a voice message only, a picture image message only, or both voice and picture image messages to other PC users simultaneously. In this case, the phone numbers or the "default" option selected by the user from the screen of this device may cause a warning message such as "Invalid e-mail address selected" to be issued on the PC screen. The user may enter an e-mail address of local police station or a 911 center from the keypad of this device. The local police station or 911 center may receive a copy of the e-mails generated by the PC software depending upon whether or not the user has selected an e-mail address for emergency calls. Thus, this device may be served as a front-end data entry gateway of a regular PC for the users to create voice and picture e-mails to communicate with a 911 center or other PC users over the Internet without passing the messages through the cellular phone towers and base stations.

Still another possible design of this voice-image e-mail transmitter device may include an embodiment that comprises this device and an alarm device connected to a movement sensor for surveillance use. In this alarm system that offers protection while at home, the voice-image e-mail transmitter device may be set to private use and the three-way toggle switch may be set to send image messages only. Both the voice-image e-mail transmitter device and the movement sensor may be hung on the wall in a room. When an unexpected burglar enters the dark room during the night his movement will trigger the sensor to turn on the room light. The alarm device attached to the sensor will be activated and its sound can warn the house owner and scare the intruder away. Optionally, a silent alarm with an adjustable sound volume can be installed in the bedroom if the house owner prefers to be warned quietly. Meanwhile, the sensor also sends a command signal through a control data line and triggers the voice-image e-mail transmitter device to take pictures of the intruder in the room. The pictures being taken will be sent to the house owner's own e-mail address over the Internet to produce evidence of a crime. If any emergency occurs, the house owner should immediately use a regular phone to dial 911 for help. Thus, this device may serve as a life-saving device during the day and a household surveillance device during the night. Of course, this household surveillance feature may also function during the day. Since the movement sensor and alarm device are believed to already exist, the design of those elements will not be described herein.

Some of the additional features of the voice-image e-mail transmitter device as described previously are in fact not essential to the emergency calls and thus may be excluded from the design of this device. To make the voice-image e-mail transmitter device really affordable, the manufacturers may consider producing the following simplified embodiments of this device to reduce its cost.

A first embodiment of a low cost voice-image e-mail transmitter device encompasses voice-image messaging as described previously without providing the PDA-like features because those additional functions can increase the cost of this device and they are not related to emergency calls.

A second embodiment of a low cost voice-image e-mail transmitter device encompasses voice-image messaging as described previously without providing regular cellular phone capability for two-way voice communication.

A third embodiment of a low cost voice-image e-mail transmitter device encompasses the voice-image messaging capability as described earlier except without providing the advanced function of a two-way voice and picture e-mail communication on this device over the Internet.

A fourth embodiment of a low cost voice-image e-mail transmitter device encompasses the voice-image messaging capability as described before except without providing a port of a USB data line connected to a Personal Computer for a two-way voice and picture e-mail communication function on a regular PC over the Internet.

A fifth embodiment of a low cost voice-image e-mail transmitter device encompasses the voice-image messaging capability as described before except without providing a port of a control data line connected to a movement sensor for a household surveillance function.

A sixth embodiment of a low cost voice-image e-mail transmitter device encompasses the voice-image messaging capability as mentioned previously except that the keypad is simplified by combining the numerical and alphabetical key buttons similar to a regular phone keypad.

A seventh embodiment of a low cost voice-image e-mail transmitter device comprises the elements described previously except the security feature to display the password window panel for the user to login is omitted. Moreover, the device does not need a locking feature.

An eighth embodiment of a low cost voice-image e-mail transmitter device comprises the voice-image functionality as described earlier wherein a short invisible wire is used instead of wireless technology to connect with the external microphone and pinhole camera devices. This embodiment also encompasses a voice-image e-mail transmitter device that provides either voice or image e-mail function and has the connection to either the external microphone or camera device but not both. In this case, the three-way toggle switch accessory component for selecting a message type is not required.

A ninth embodiment of a low cost voice-image e-mail transmitter device comprises the voice-image functionality mentioned previously with the added limitation that the device has essentially the same width and length dimensions as that of a typical credit card. This version is small enough to be carried in a shirt pocket and may have a built-in microphone and a tiny external pinhole camera like a button connected by a wire to the device. The button shape camera may be attached to the front of a shirt with a pin. Optionally, the external camera may be hand held and in the shape of a pen that has a clip and a push button. The clip may serve to attach the camera to a shirt pocket and the push button may be used to take pictures by pointing the tip of the pen towards a particular object.

A tenth embodiment of a low cost voice-image e-mail transmitter device comprises a very small screen having only a few lines capability that allows the user to either type in one e-mail address or select the "default" option. This version does not allow the user to change the device from default emergency call function to private use.

An eleventh embodiment of a low cost voice-image e-mail transmitter device comprises a medium size memory chip that is large enough to produce the digital signal string for the voice-image message receiving station to create the voice and image message files in a ".wav" format and a ".jpeg" format instead of creating the very larger sized video message file in a ".wmv" or ".mpg" format like a short motion pictures file.

Without providing the two-way voice communication function like the cellular phone, this device does not need to have a regular phone number. The user who selected the "default" option and does not use this device as a cellular phone may not need to pay any fees. Thus, the simplified and low cost voice-image e-mail transmitter device may be totally dedicated for emergency calls through e-mails and is most suitable for young children to use. As this device is a critical life-saving tool, parents should always check that the battery is sufficiently charged to provide emergency calls anytime during the day. Furthermore, parents should teach their children that whenever they are alone and feel threatened by someone they should not hesitate to use this device to take a picture and send a message.

A simplified version of the voice-image e-mail transmitter device can provide the desired benefits to most people who wish to use this device as a low cost life-saving tool. However, those who frequently use a regular cellular phone would more likely favor one or more of the more expensive features in order to optimize the performance of the voice-image e-mail transmitter device.

As mentioned previously, the voice-image e-mail transmitter device is similar in several aspects to a regular cellular phone and it has the capability to provide all the functions of a cellular phone. However, there are many new features provided by the voice-image e-mail transmitter device that cannot be found in a regular cellular phone. For example, the security system and the locking feature of the sliding push button, the portable surveillance function with picture image messages, the traceable device serial number identification in a national database, the capability to provide a function similar to digital camera or camcorder, the message type selection capability by a three-way toggle switch, the phone records tracking system, the e-mail secret code for maintaining original forensic evidence, the fast voice and image e-mail message delivering system for emergency calls, the advanced function of a two-way voice and picture e-mail communication on this device and on a regular PC over the Internet, the household surveillance device and alarm system, and the entire system that combines this device and the wireless communication network with the new software and the Internet e-mails for a life-saving function, etc. are all unique features of this device.

The innovative features of the voice-image e-mail transmitter device described herein should be recognized by those skilled in the art to be readily adaptable to the next generation of cellular phones. Therefore, one or more of the unique features previously described may be added to current cellular phone technology as an upgrade.

While this invention has been particularly shown and described with reference to, the preferred embodiment thereof, it will be understood by those skilled in the art that various changes in form and details may be made without departing from the spirit and scope of this invention.

I claim:

1. A communication device also known as a voice-image e-mail transmitter device for sending information in digital format wherein said information includes an e-mail address and user name, a device serial number, and one or both of a voice message and an image, said device comprising:
   a base portion comprised of a keyboard for data entry, a key button pad for selecting different functions, a three-way toggle switch for message type selection, and a sliding push button for sending voice and image signals, voice message with no image, or image with no voice message that are subsequently converted to one or more message files at a receiving station, said sliding push button is pressed to record a message and released to send said recorded message and said information to a pre-determined e-mail address and moves sideways along a side of the base portion to enable a security lock feature; and
   a cover portion comprised of a viewing screen.

2. The communication device of claim 1 further comprised of an internal central process unit (CPU), an internal clock, and static and dynamic memory chips in the base portion.

3. The communication device of claim 2 wherein the CPU is used to convert voice input data and image input data into digital signals, and the dynamic memory chips are used to store the converted digital signals.

4. The communication device of claim 1 wherein the base portion is further comprised of a wire that connects the voice-image e-mail transmitter device to an external microphone and/or camera device that is attached to an ornament or an article of clothing the user is wearing.

5. The communication device of claim 1 wherein the voice and image information further comprises a time code.

6. The communication device of claim 1 wherein the sliding push button is pushed in to collect voice input from an external microphone and image data from an external camera device and is released to transmit the voice and image data in a digital string format to a receiving station through an antenna connected to or imbedded in the base portion.

7. The communication device of claim 1 wherein the base portion is equipped with security features that allow the user to slide said push button sideways to temporarily disable the send function and prevent an unauthorized user from sending a message and require a password to re-enable the sliding push button function.

8. The communication device of claim 1 wherein a secret code is embedded in the message files to maintain the information in its original form so that the associated message files may be kept together in an e-mail file as a legal document for forensic evidence.

9. The communication device of claim 1 wherein the dynamic memory capacity is large enough to enable the transmission of voice and image data messages that may be converted into a ".mpg" or ".wmv" format by a voice-image message receiving station.

10. A system for sending and receiving voice and image information in digital format, said system comprising:
(a) a voice-image e-mail transmitter device for sending information wherein said information includes an e-mail address and user name, a device serial number, and one or both of a voice message and an image, said voice-image e-mail transmitter device is comprised of
  (1) a base portion having a keyboard for data entry, a button pad for selecting different functions, a three-way toggle switch for selecting message type, and a sliding push button for sending voice and image signals, voice message with no image, or image with no voice message that are subsequently converted to one or more message files at a receiving station, said sliding push button is pressed to record a message and released to send said recorded message and said information to a pre-determined address and moves sideways to enable a security lock feature;
  (2) a cover portion comprised of a viewing screen;
(b) at least one cellular phone tower which is at a location that can relay voice and image signals received from the voice-image e-mail transmitter device; and
(c) a voice-image message receiving station that can convert voice and image signals from the voice-image e-mail transmitter device into one or more message files which are forwarded to one or more e-mail addresses.

11. The system of claim 10 wherein the voice-image message receiving station comprises software capability that is used to parse out the voice and image information from the received digital signal strings and create e-mail files.

12. The system of claim 10 wherein the voice-image e-mail transmitter device comprises software functionality that is used to imbed a secret code in the voice and image signals which maintains the integrity of the text files in newly created e-mails that are sent to pre-defined e-mail addresses over the Internet.

13. The system of claim 10 further comprised of an external camera device and external microphone that collect image and voice data, which are transmitted to the voice-image e-mail transmitter device by a wireless means or by a wire.

14. The system of claim 10 wherein the voice-image e-mail transmitter device is further comprised of an internal central process unit (CPU), static and dynamic internal memory chips, and an internal clock in the base portion.

15. The system of claim 14 wherein the CPU converts voice signals and picture images into digital signals and the dynamic memory is used to store the converted digital signals.

16. The system of claim 10 wherein the three way toggle switch enables the voice-image e-mail transmitter device to send voice messages only, image messages only, or voice and image messages simultaneously.

17. The system of claim 10 wherein the voice-image e-mail transmitter device is further comprised of functionality that enables two-way voice and picture e-mail communication.

18. The system of claim 10 wherein the voice-image e-mail transmitter device and an alarm device are connected to a movement sensor and are affixed to a wall or another structure for household surveillance use.

19. The system of claim 10 wherein the sliding push button is formed on a side of the base portion and is pushed inward to collect image and voice input from a camera device and external microphone and is released to send a voice message and/or picture messages to at least one cellular phone tower or a voice-image message receiving station through an antenna connected to or imbedded in the base portion.

20. The system of claim 10 wherein the voice and image signals are received essentially simultaneously by two cellular phone towers that allow the voice-image e-mail transmitter device user's approximate location to be determined by a triangulation process.

* * * * *